Sept. 8, 1925.　　　　　　　　　　　　　　　　1,552,538
B. BRAYSHAW
MILKING MACHINE
Filed Aug. 22, 1919　　　　　　4 Sheets-Sheet 1
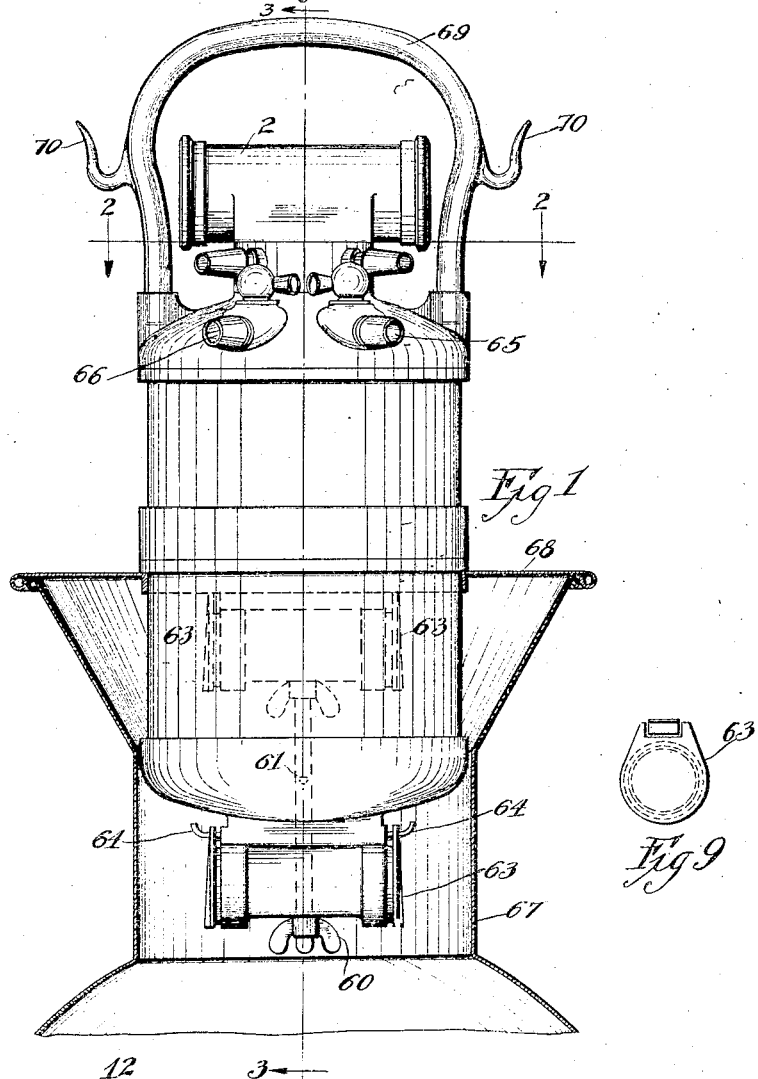
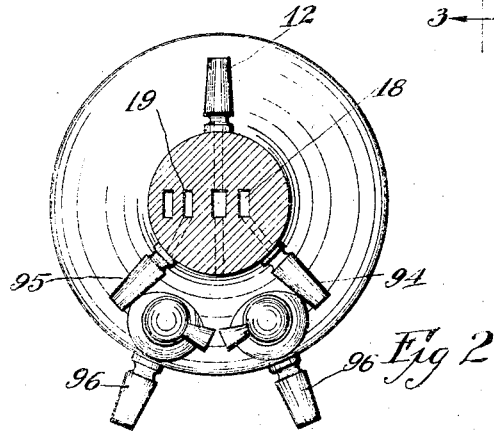
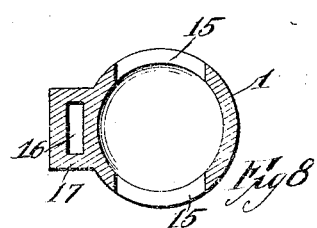
INVENTOR.
B. Brayshaw
BY Munn &Co.
ATTORNEYS Sept. 8, 1925.                    B. BRAYSHAW                    1,552,538
                                  MILKING MACHINE
                              Filed Aug. 22, 1919              4 Sheets-Sheet 2
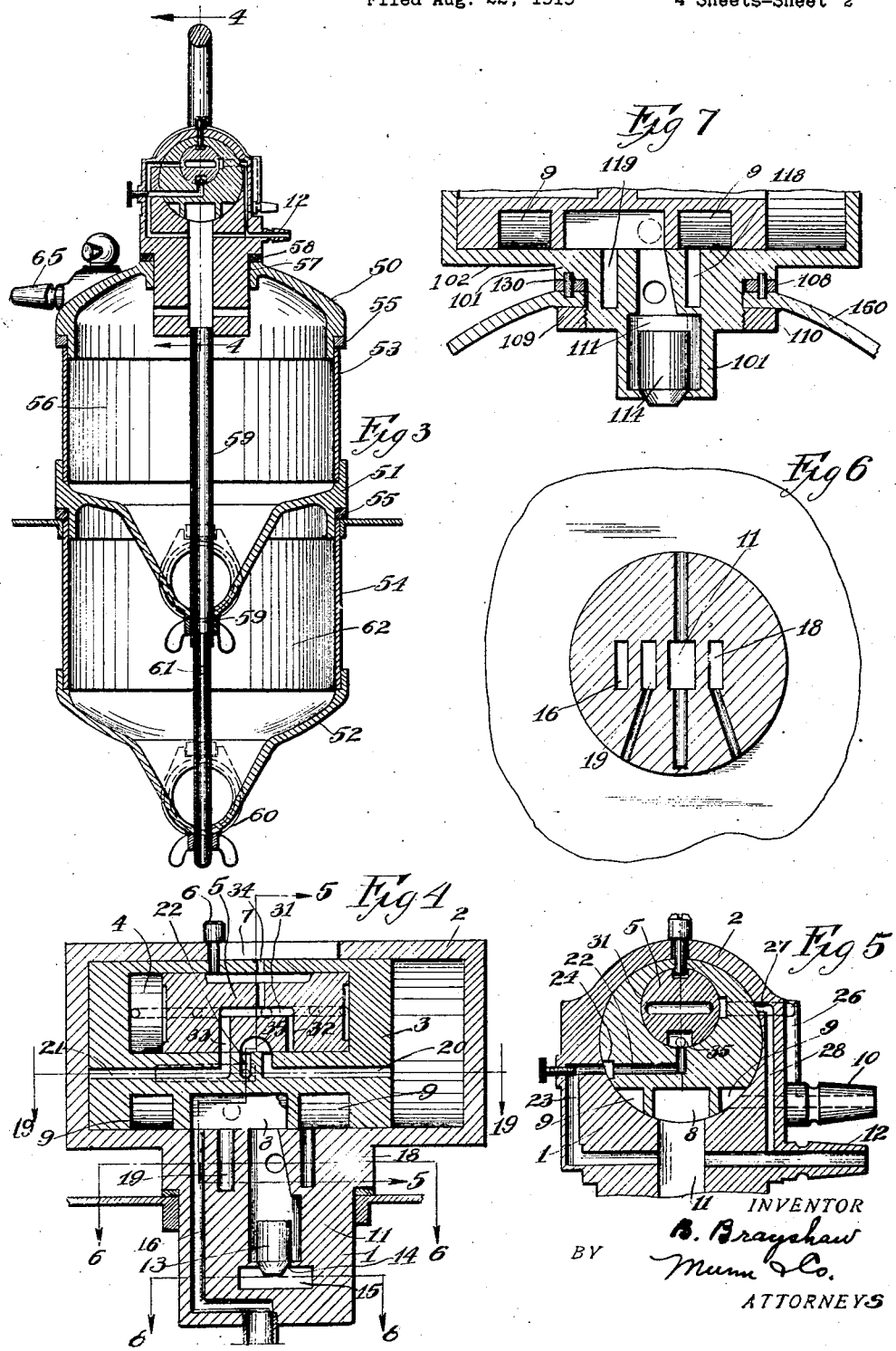
INVENTOR
B. Brayshaw
BY Munn & Co.
ATTORNEYS Sept. 8, 1925.
B. BRAYSHAW
MILKING MACHINE
Filed Aug. 22, 1919 4 Sheets-Sheet 3
1,552,538
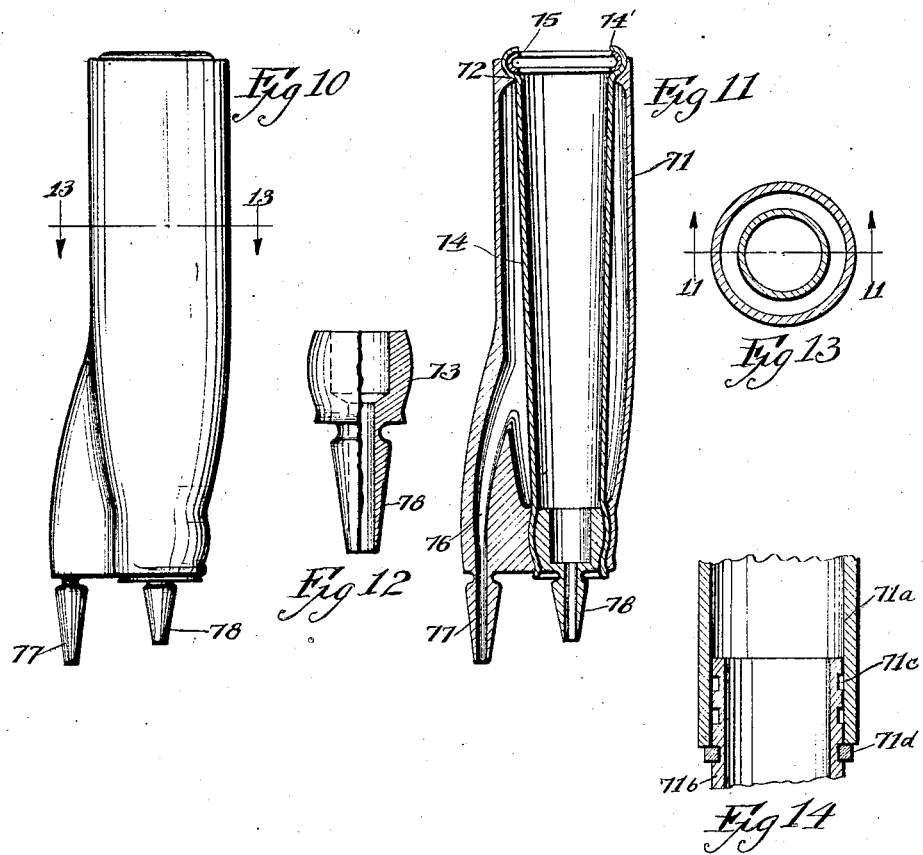
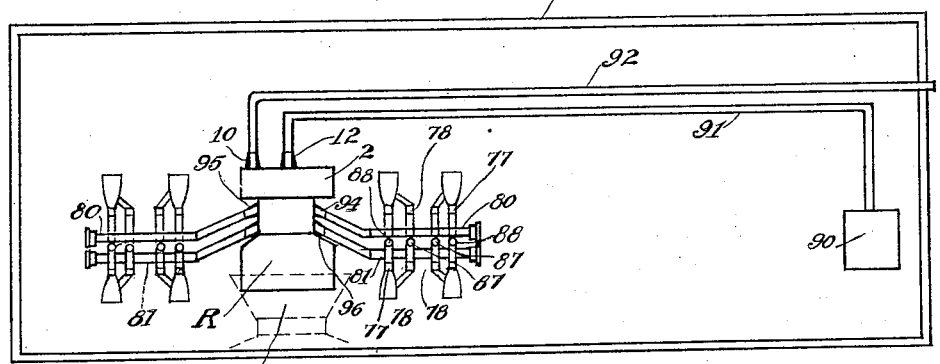
INVENTOR
B. Brayshaw
BY Munn & Co.
ATTORNEYS Sept. 8, 1925.

B. BRAYSHAW

MILKING MACHINE

Filed Aug. 22, 1919

4 Sheets-Sheet 4

1,552,538

INVENTOR
B. Brayshaw
BY
Munn & Co.
ATTORNEYS

Patented Sept. 8, 1925.

1,552,538

UNITED STATES PATENT OFFICE.

BERTIE BRAYSHAW, OF FORT ATKINSON, WISCONSIN, ASSIGNOR, BY MESNE ASSIGNMENTS, TO THE GENERAL TOOL & MANUFACTURING COMPANY, OF MILWAUKEE, WISCONSIN, A CORPORATION OF WISCONSIN.

MILKING MACHINE.

Application filed August 22, 1919. Serial No. 319,145.

*To all whom it may concern:*

Be it known that I, BERTIE BRAYSHAW, a citizen of New Zealand, and a resident of Fort Atkinson, in the county of Jefferson and State of Wisconsin, have invented new and useful Improvements in a Milking Machine, of which the following is a full, clear, and exact description.

My invention relates to improvements in milking machines, and it consists in the combinations, constructions and arrangements herein described and claimed.

An object of my invention is to provide an improved form of automatic "pulsator," whereby the various parts of the milking machine, such as the teat cups, the claw and the releaser, may be connected with a vacuum pipe, or air pipe.

A further object of my invention is to provide a novel form of "releaser", in which valves are provided for permitting the discharge of the milk from the releaser into the receiver automatically, the action of the valves being regulated by the difference in pressure effected by the pulsator.

A further object of my invention is to provide an improved form of claw, by means of which the milk, coming from the teat cups, is forced automatically into the receiver.

A further object of my invention is to provide a novel form of teat cup in which the expansion and contraction of a resilient inner member, i. e., a rubber tube, is effected in such manner as to cause a maximum discharge of milk, and at the same time prevent injury to the cow.

Other objects and advantages will appear in the following specification, and the novel features of the invention will be particularly pointed out in the appended claims.

My invention is illustrated in the accompanying drawings, forming part of this application, in which—

Figure 16:
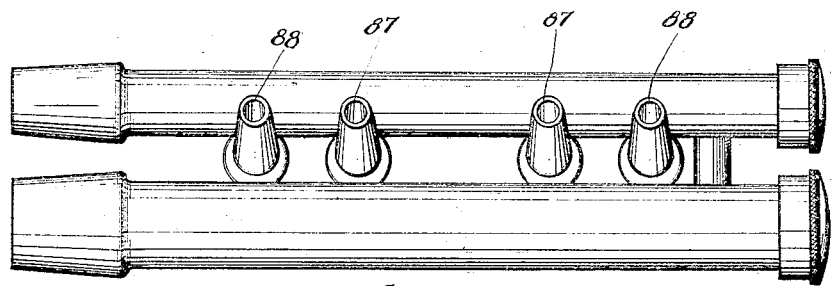
Figure 17:
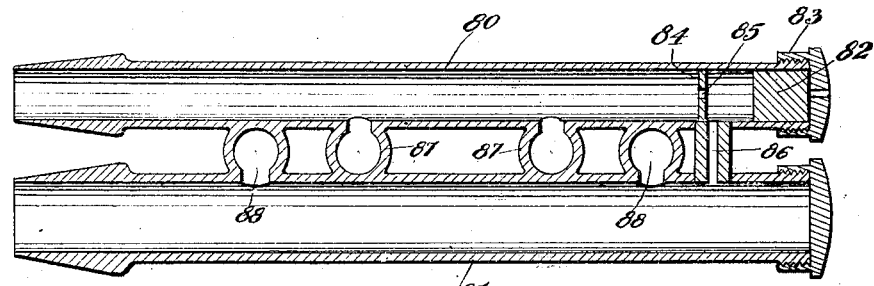
Figure 18:
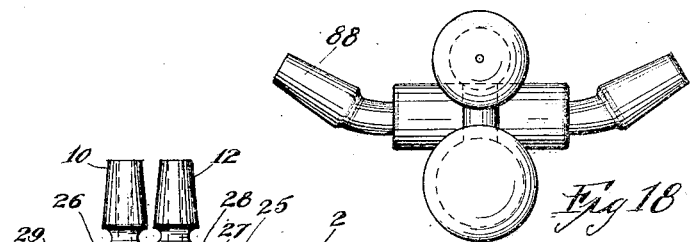
Figure 19:
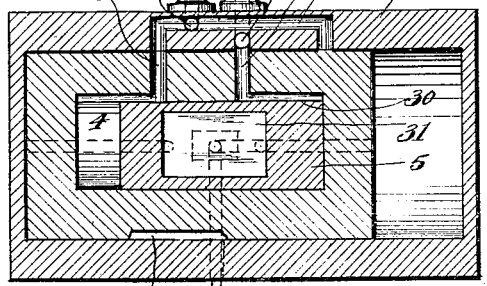

Figure 1 is a side view of the pulsator and releaser, the receptacle being shown in section, Figure 2 is a section along the line 2—2 of Figure 1, Figure 3 is a section along the line 3—3 of Figure 1, Figure 4 is an enlarged section through the pulsator, along the line 4—4 of Figure 3, Figure 5 is a section along the line 5—5 of Figure 4, Figure 6 is a section along the line 6—6 of Figure 4, Figure 7 is a section through a portion of a modified form of the pulsator, Figure 8 is a section along the line 8—8 of Figure 4, Figure 9 is an end view of a flap valve, Figure 10 is a side view of a teat cup, Figure 11 is a section through the teat cup, shown in Figure 10, Figure 12 is a view partly in section of a plug used in connection with the teat cup, Figure 13 is a section along the line 13—13 of Figure 10, Figure 14 is a section through a portion of a modified form of teat cup, Figure 15 is a diagrammatical view, showing the connections between the various parts of the milking device, Figure 16 is a side view of a modified form of claw, Figure 17 is a central section through the claw, Figure 18 is an end view of the claw, and Figure 19 is a section along the line 19—19 of Figure 4.

Referring now particularly to Figures 4, 5 and 19, I have shown thereon a pulsator having a body portion 1, upon which is mounted an integral valve casing 2. The casing 2 is provided with a cylindrical recess arranged to receive a piston valve 3. The latter is provided with a cylindrical recess 4 arranged to receive an auxiliary piston valve 5. The piston valve 3 is guided in its movement by means of a guide pin 6, disposed in the slot 7. The bottom of the piston valve 3 is provided with a recess 8 of substantially rectangular cross section. A rectangular passage 9 is disposed exteriorly of the recess 8. A portion of the side walls of the passage 9 is formed by the body portion 1, as will be seen in Figure 5. The passage 9 is in constant communication with the outer atmosphere by means of a pipe 10 (see Figure 5), while the recess 8 is connected by means of a passage 11 with a pipe 12, leading to a vacuum tank, as will be explained later. At the bottom of the passage 11 there is a valve 13 which normally rests on a valve seat 14. Below the valve is a slot 15 which, as will be seen from Figure 8, extends through the lower part of the body portion 1 from side to side. A passageway 16 is formed in an extension 17 of the body portion 1, this passage being in communication with the recess 8 in the position of the valve in Figure 4. A passage 18 is on one side of the central passage 11, while a similar passage 19 is on the opposite side, (see Figure 4). The piston valve 3 is provided with two longitudinally extending passages 20 and 21 respectively, running in from opposite ends of the valve, these passages being turned upwardly as shown in Figure 4. The valve 3 also has a passage 22 which enters from one side (see Figure 5) and then is turned upwardly between updrawn portions of the passages 20 and 21 (see Figure 4). The passage 22 is always in communication with a passage 23 by means of a recess 24 (see Figure 5) which runs longitudinally with respect to the valve 3, so that no matter what position the valve is in, communication is established between the passages 22 and 23.

Referring now to Figure 19, it will be seen that the casing 2 is provided with a U shaped passage 25 which communicates by means of a downwardly extending passage 26 with the air pipe 10 (see also Figure 5). A port 27 communicates by means of a passage 28 with the vacuum pipe 12. L shaped passages 29 and 30 are provided, leading to the opposite ends of the recess 4. The piston valve 5 has a central recess 31 having downwardly extending passages 32 and 33 at its ends. The recess 31 communicates with the outer atmosphere by means of a passage 34.

The operation of the pulsator is as follows:

In Figures 4 and 19, the piston valve 5 has just reached the end of its stroke toward the right within the recess 4. It will be observed that the passage 30 is in communication with the vacuum pipe connection 12 by means of the port 27 and the passage 28, while the opposite end of the cylindrical recess 4 is in communication with the outer atmosphere through the passage 29, the pipe 26 and the air pipe connection 10. There is therefore less pressure at the right end of the piston valve 5 than at the left, and the valve has moved accordingly to the end of the cylindrical recess 4. This movement has brought the passage 33 into registration with the passage 21 (see Figure 4). The passage 33 being open to the atmosphere places atmospheric pressure at the left end of the larger piston valve 3 in Figure 4, while the space in the right end of the valve casing 2 is now in communication by means of the passage 20, the recess 35, the passages 22, 23 and 11 with the vacuum pipe 12. This causes the piston valve 3 to move from left to right in Figure 4. The movement of the piston valve 3 over to the right brings the passage 29 (see Figure 19) into registration with the port 27, which is connected with the vacuum pipe connection 12, while the passage 30 is brought into registration with the U shaped passage 25 connected with the air pipe connection 10. Conditions are now reversed and the small piston valve 5 is moved to the left. This brings the passage 32 (see Figure 4) in communication with the passage 20, thus putting air pressure at the right end of the piston valve 3. It also places the passage 22 in communication with the passage 21 through the recess 35, thus putting the left end of the cylindrical casing 2 in communication with the vacuum pipe 12. Thereupon the large piston valve moves toward the left. This action is repeated automatically, the rate of movement being proportional to the amount of vacuum or to the difference in pressure at the opposite ends of the piston valves.

Consider now the action with respect to the passage 16. In the position of the larger piston valve 3, the passage 16 is connected with the vacuum pipe connection 12 through the medium of the passage 11 and the recess 8. The vacuum lifts the valve 13 and places the chamber 56 of the releaser (see Figure 3) under vacuum, as will be explained later. Now when the large piston valve 3 is moved to the right, that portion of the passage 9 at the left in Figure 4 is in communication with the passage 16, which is then placed under normal atmospheric pressure. It will thus be seen that the passage 16 is alternately placed under vacuum and then under atmospheric pressure.

In the position of the parts shown in Figure 4, the passage 18 is in communication with the passage 9 which, as stated, is connected with the air pipe connection 10. When the piston valve 3 is shifted to the right, the recess 8 will register with the passage 18, thus putting the latter under vacuum, while the opposite side of the passage 9 will register with the passage 19, thus putting the latter under atmospheric pressure. The shifting of the piston valve 3 will therefore place the passages 18 and 19 alternately under vacuum and atmospheric pressure. In Figures 1 and 3, I have shown the pulsator as being carried at the top of the releaser.

The construction of the releaser is best shown in Figure 3. It consists of an upper casting 50, a center casting 51, and a lower casting 52, the upper and central castings being connected by a cylindrical metal portion 53, and the central and lower castings being connected by a similar metal cylindrical member 54. Gaskets 55 are provided for making the upper chamber 56 between the upper and central castings air tight.

The bottom 1 of the pulsator enters an opening 57 in the casting 50, a gasket 58 being provided. A centrally disposed pipe or tube 59 is secured in the end of the passage 16 in the pulsator, this pipe extending downward through the central portion of the castings 51 and 52, being secured in position by means of winged nuts 59 and 60 respectively. The pipe is provided with an opening 61 communicating with a bottom chamber 62.

At the bottom of the chambers 56 and 62 is a valve casing. Both of these valve casings are alike, and a description of one will suffice for both. In Figure 1, it will be seen that the lower valve and casing has at each end flap valves 63 which are hinged on hooks 64 in such a manner that when the pressure on the inside of the casing is lower than that on the outside, the valves are shut up. When the pressure is lower on the outside or in the bottom chamber, the valves will open to discharge the milk, as hereinafter explained. It has heretofore been pointed out how the passage 16 is alternately subjected to the action of the vacuum and to the ordinary air pressure. The milk enters tubes 65 and 66 into the upper compartment 56, which continually is under decreased pressure, and runs down to the bottom of the chamber 56. Now, when valve 3 is in the position shown in Figure 4, the lower chamber 62 is in communication with the vacuum pipe 12, through 11, 8, 16, 59 and 61, and the flap valves 63 of the lower chamber are closed. The lower chamber 62 is now under greater decreased pressure than the upper chamber 56, this difference of pressure being regulated by the weight of the valve 13. The flap valves 63 of the upper chamber 56 will now open, permitting the milk at the bottom of chamber 56 to flow into chamber 62. Then valve 3 of the pulsator moves to the other end of the stroke, connecting the lower chamber 62 with atmospheric pressure in 10 through 9, 16, 59 and 61, and now flap valves 63 at the bottom of chamber 62 open, due to the suddenness of the equalization of pressure on both sides of the valves, and now the milk flows from the chamber 62 into the receiver 67. It will be observed that the releaser may be set into the can or receiver 67, supported by the wing 68. The releaser is provided with a handle 69 having hooks 70 for the purpose of holding the claw with the cups attached, when not in operation.

In Figures 10 and 11, I have shown my improved form of teat cup. It consists of an outer metal casing 71 having an annular shoulder 72 at its upper end. At the lower end the casing is formed to receive a tapered plug 73, such as that shown in Figure 12. A rubber tube 74 forms the expandable and flexible medium, by means of which the compression and expansion of the teat is effected. The upper end of the tube is held by a metal ring 75, the end of the tube being drawn over the ring. The tube is then placed inside the cup case and the ring seats on seating 72. The other end of the tube is then drawn through the lower end of the cup case, and the plug 78 is inserted in the tube. The ring 75 and the plug 78 are held in position by the flexibility of the tube 74. The connection 78 is continually under decreased pressure, while the connection 77 is under atmospheric pressure and a greater decreased pressure, alternately, by means of the by-pass 76.

This form of cup has many advantages. The tube 74 is a straight cylindrical tube which may be readily inserted and readily removed. The ring 75 forms a metal contact with the teat of the cow, which under ordinary circumstances would be used. The metal contact or grip is preferable in most cases because of the fact that it permits the tissues of the teat to resume their normal position when the tube is collapsed, whereas a rubber connection tends to prevent the ready return of the tissues, owing to its clinging action. It sometimes happens, however, that a cow, having a small teat, may be milked better if the rubber is brought up, closing around the teat. This may be very readily done by drawing the edges 74' farther over the ring 75, so that the teat cup has the advantages of both the metal and the rubber connection or grip at the top. It will be observed that the space between the casing and the tube is of such extent that the release takes place initially below the teat, and this causes the tissues to move back to their original position in the most natural manner and without any drag or injury to the teat.

In Figure 14, I have shown a modified form of the teat cup in which provision is made for stretching the rubber tube. After continued periods of use, the rubber will stretch and become loose. In Figure 14, the casing is made in two sections 71ª and 71ᵇ. The latter is made with a series of grooves 71ᶜ into which a gasket 71ᵈ may fit. In order to stretch the rubber, it is only necessary to draw out the telescopic sections, and slip up the gasket 71ᵈ into the next succeeding groove 71ᶜ.

In Figures 16 to 18 inclusive, I have shown a novel form of claw, by means of which the milk coming from the teat cups may be forced to the releaser, milk can, or milk pipe, though they be some distance away. In the drawings, I have shown two tubes 80 and 81 respectively, which are connected together. In Figure 17 the tube 80 is provided with a cylindrical valve member 82, the end of the tube being closed by a screw cap 83, having a small vent hole. A partition or stop member 84 has an opening 85 leading into the chamber between the partition and the screw cap 83. A passageway 86 is provided in a connecting pipe leading into the tube 81. On one side of the claw are two pipe connections 87 which communicate with the interior of the tube 80. Similar connections 88 communicate with the interior of the tube 81.

The apparatus described above is designed for use in milking two cows simultaneously, or it may be used for one cow. In Figure 15, I have shown diagrammatically the manner in which the various parts of the apparatus are connected up. In this figure, a vacuum tank 90 is connected by means of a pipe 91 with the pipe connection 12. An air pipe 92 extends outside of the barn 93 and conveys pure air to the pipe connection 10. The tube 80 of one claw is connected to a pipe connection 94 and the claw on the opposite side is connected to a pipe connection 95, these pipe connections being shown in Figure 2. The pipe connection 94 communicates with the passage 18, while the pipe connection 95 communicates with the passage 19. The tubes 81 of both claws communicate with pipe connections 96 leading into the releaser. The releaser, which is shown diagrammatically at R in Figure 15, empties into the can or receptacle 67.

The operation of the device is as follows:

When the piston valve 3 of the pulsator is in the position shown in Figure 4, the lower chamber 62 (see Figure 3) is placed under vacuum, the air in this chamber passing through the opening 61 in the pipe 59, thence through the passage 16, the recess 8, and passage 11, and through the pipe 91 to the vacuum tank 90. The vacuum in the recess 11 raises the valve 13 and puts the upper chamber under vacuum by means of the slot 15 (see Figure 8), which communicates at its end directly with the upper chamber 56; therefore the upper chamber 56 is continually under decreased pressure. The vacuum in the upper chamber is less than that in the lower because of the lifting of the valve 13. The difference in the vacuum depends, of course, upon the weight of the valve. In the upper chamber, it may be fifteen inches, while in the lower, seventeen inches.

Referring again to Figure 15, it will be seen that the pipe connection 78 of each of the teat cups is connected with the tube 81 of the claw, through the medium of the pipe connections 88, while the pipe connection 77 of each of the teat cups is connected with the tube 80 through the medium of the pipe connections 87. The tube 81 is under a vacuum all the time and tends to draw the milk from the teat. The tube 80 is alternately under vacuum and air pressure. Being under a higher vacuum than the interior of the rubber tube 74, the space between the rubber tube 74 and the casing 71 of the teat cup has air withdrawn therefrom, causing the rubber tube 74 to expand. In the meantime the vacuum within the rubber tube is drawing down on the teat. Now, when the pulsator acts to release, that is to admit air around the rubber tube, the latter will collapse and the tissues of the teat have a chance to return to their normal position. The pulsator acts so as to give a long pull and a comparatively short release. To this end the central recess 8 of the valve 3 is made large, so that while the valve is moving, the vacuum will remain for a comparatively long period between the tube 74 and the casing 71 of the teat cup through either port 18 or 19 of Figure 6, according to the direction valve 3 is travelling. The passages 9 are of relatively small dimension compared with the recess 8, so that the movement of the valve 3, which brings these passages 9 into registration with the passages 18 and 19, only allows air to enter the passages 18 and 19, so as to effect a release of the rubber tube 74, for a very short time. This long pull and short release upon the teat is a very important feature of the invention.

The milk flows into the tube 81 of the claw, the tube 80 of the claw being alternately under vacuum and normal air pressure, and its valve 82 is drawn to the left in Figure 17 to cover the openings 85 and the passage 86 and to uncover them when the air pressure is admitted. This operation allows the air to force the milk from the tube 81 into the upper chamber of the releaser, or milk container, in case no releaser is used. The milk in the upper chamber 56 falls to the bottom of the chamber and remains there until a vacuum is placed on the lower chamber 62, whereupon the valves 63 will suddenly spring open, thereby permitting the milk to pass from the upper chamber 56 into the lower chamber 62. When air is admitted to the lower chamber, then the valves 63 of the upper chamber close, and the valves 63 of the lower chamber open, thus depositing the milk in the receptacle.

It will be seen that the operation of the teat cup depends upon a particular kind of pulsator, which controls the vacuum and the air to permit the long pull and the short release.

In Figure 7 the valve casing 102 has an extension 101, provided with a recess or passage 111, in which the valve 114 is disposed. The extension 101 enters a central opening in the top of the milk bucket 150. The latter may have a pin 130 arranged to enter a portion of the extension 101, a gasket 108 being provided through which the pin passes. The body portion 101 is threaded at 109 and a nut 110 securely holds the extension to the bucket top 150. In securing the pulsator to the bucket top, a gasket 108 is slipped on the pins 130, the extension 101 is passed through the opening, and the nut 110 is turned from the underside of the bucket top. The operation of this form of the pulsator is the same as that already described. There is, however, no passage corresponding to the passage 16 in Figure 4, since the latter is for the purpose of operating the releaser which is dispensed with, in the form of the device shown in Figure 7.

I claim:

1. In a milking machine, a pulsator comprising a main piston valve having a recess extending to the outside thereof, a groove surrounding said recess, a body portion arranged to receive said valve and having a passage registering with said recess, and several individual passages arranged to register with the groove alternately as the valve is shifted, the time of registration of the groove with passages being relatively short as compared with the time of the registration of the recess with passages.

2. In a milking machine, a pulsator comprising a main piston valve having a recess extending to the outside thereof, a groove surrounding said recess, a body portion arranged to receive said valve and having a passage registering with said recess, several individual passages arranged to register with the groove alternately as the valve is shifted, the time of registration of the groove with passages being relatively short as compared with the time of the registration of the recess with passages, and means for placing the recess in the main piston valve constantly under vacuum, and for placing the groove in the piston valve constantly under air pressure.

BERTIE BRAYSHAW.